United States Patent [19]
Drori

[11] Patent Number: 5,899,231
[45] Date of Patent: May 4, 1999

[54] AUTOMATIC THREE-WAY VALVE

[76] Inventor: Mordecki Drori, 6400 Center St., Mentor, Ohio 44060

[21] Appl. No.: 08/998,499

[22] Filed: Dec. 30, 1996

Related U.S. Application Data

[60] Provisional application No. 60/034,087, Dec. 30, 1996.

[51] Int. Cl.$^6$ ...................................................... F16K 11/02
[52] U.S. Cl. .......................................... 137/625.5; 251/77
[58] Field of Search .............................. 251/77; 137/625.5

[56] References Cited

U.S. PATENT DOCUMENTS

| | | | |
|---|---|---|---|
| 507,661 | 10/1893 | Langford | 137/625.5 X |
| 2,616,658 | 11/1952 | Dombeck | 137/625.5 |
| 3,779,280 | 12/1973 | Evans et al. | 137/625.5 |
| 4,470,429 | 9/1984 | Johnson . | |
| 4,651,775 | 3/1987 | Okada . | |
| 4,852,612 | 8/1989 | Bucko, Sr. . | |
| 4,924,911 | 5/1990 | Schmalenbach et al. . | |
| 4,982,760 | 1/1991 | Mustaklem . | |
| 5,441,080 | 8/1995 | Baumann . | |

FOREIGN PATENT DOCUMENTS 521819 3/1931 Germany .............................. 137/625.5

*Primary Examiner*—John Fox
*Attorney, Agent, or Firm*—Renner, Otto, Boisselle & Skiar, P.L.L.

[57] ABSTRACT

The present invention relates to a method and apparatus incorporating an automatic, three-way valve having inlet, outlet and drain passages and a close-open timing mechanism. The timing mechanism is adjusted to a predetermined period of time in order to close the drain passage and then open the outlet passage or vice-versa automatically after a predetermined period of time in response to the starting or stopping of an external source of pressurized fluid being directed to the three-way valve.

9 Claims, 6 Drawing Sheets in
AUTOMATIC THREE-WAY VALVE

RELATED APPLICATIONS

This application claims the benefit of U.S. Provisional application Ser. No. 60/034,087 filed Dec. 30, 1996 entitled AUTOMATIC THREE-WAY VALVE.

FIELD OF THE INVENTION

The present invention relates to valves and particularly to automatic three-way valves and the method for using same with filters operating with filter aid material, such as diatomaceous earth, in order to prevent such filters from transferring fine particles to the filtered fluid area at the beginning of the filtering operation when the cake is not yet uniformly disposed around the filter element and in many other applications.

BACKGROUND OF THE INVENTION

Three-way valves have many industrial uses and are common in all kinds of assemblies. Most three-way valves are ball valves, manually operated in most cases. In order to operate such valves automatically, an electric or hydraulic motor, or an actuator, must be mounted on the ball valve to shift the interconnection and communication between the valve passages. Actuators and electric motors are both unwieldy, expensive and complex. In addition, ball valves also suffer from a fundamental shortcoming, in that their sealing is achieved by a close fit between the ball surface and the surface of a rigid seat mounted on the valve body. The relatively large friction area is sensitive to entrapped sand or other particles, causing the valve to seize and interfere with the operation of changing the state of communication between the valve passages.

SUMMARY OF THE INVENTION

In accordance with a broad aspect of a preferred embodiments of the present invention, there is provided a method and apparatus incorporating an automatic valve, preferably a three-way valve constructed of a housing having inlet, outlet and drain passages and including an internal close-open timing mechanism. The timing mechanism is adjusted to a predetermined period of time in order to close the drain passage and open the outlet passage or to close the outlet passage and open the drain passage. The opening and closing of passages occurs automatically after a predetermined period of time in response to the starting or stopping of an external source of pressurized fluid such as a pump which provides pressurized fluid to the three way valve.

The automatic three way valve, in accordance with the present invention, comprises a housing having inlet, outlet and drain passages and an hydraulic unit connected to the housing and to an internal movable shaft moving with two stops set apart a predetermined distance and between drain passage and outlet passage. A sealing flange is located around the movable shaft and disposed between the two stops. The stops are adjusted with respect to each other so that the sealing flange moves into sealing relationship with either the outlet or the drain passages. The movable shaft is adjusted to move linearly and freely through a central aperture located on the central area of the sealing flange. The movement of the shaft is limited to the distance traveled until one of the two stops pushes against the sealing flange in order to open either one of the outlet or drain passages and closing the other one of the passages. Controlling the period of time between the entering of pressurized fluid to the inlet passage of the three way valve from a source of pressurized fluid which flows through the inlet passage to the drain passage until the opening of the outlet passage and the closing of the drain passage is an important aspect of the present invention. This period of time is controlled by adjusting the distance between the two stops located on the movable shaft and the size of the passage of pressurized fluid located on the hydraulic unit. A control valve, preferably of a relatively small size, is connected to the pressurized fluid passage located on the hydraulic unit. The control valve is provided in order to control the size of the opening of the pressurized fluid passage and the period of time between the opening or closing of the pressurized fluid flow to the valve and the time of the opening or closing of the outlet or the drain passages.

The method and apparatus of the automatic three way valve described and claimed in the present invention are preferably for the use with filters using filter aid material, such as diatomaceous earth (DE), to prevent penetration of fine particles, usually sediments, to the filtered fluid area which would result in the filtered fluid being contaminated with the fine particles during the first stages of filtration when the cake of filter aid material has still not yet or not completely built itself up around the filter element. The present invention provides features allowing the fine particles to drain separately from the filtered fluid for a predetermined time. After the predetermined period of time has passed, the drain passage automatically closes and the flow of filtered fluid from the filter is directed through the outlet passage to a filtered fluid collection area, such as a pool.

DETAILED DESCRIPTION OF PREFERRED EMBODIMENTS

Figure 1:
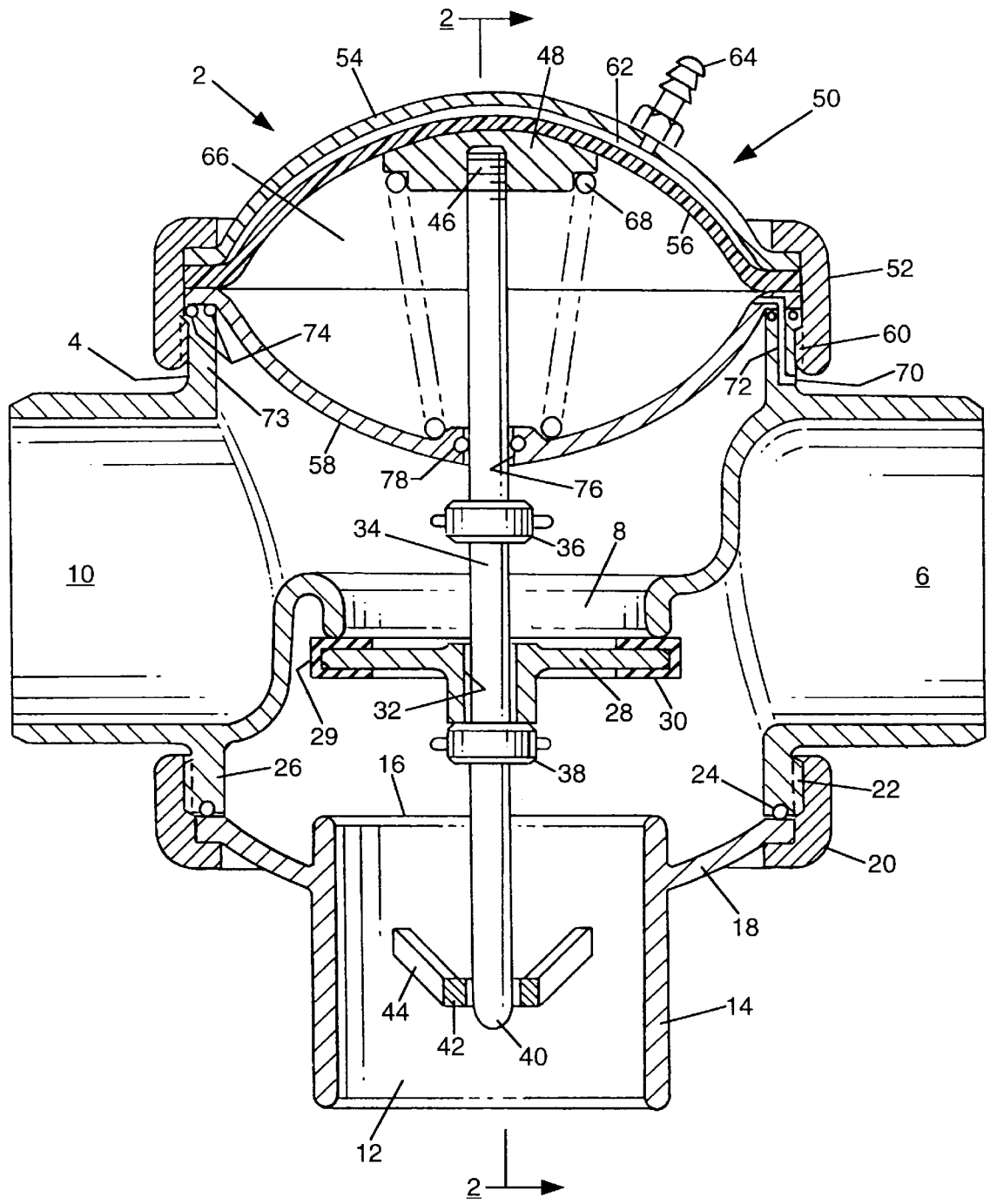
FIG. 1 is a cross-sectional view illustrating an automatic three way valve constructed in accordance with the preferred embodiment of the present invention.
Figure 2:
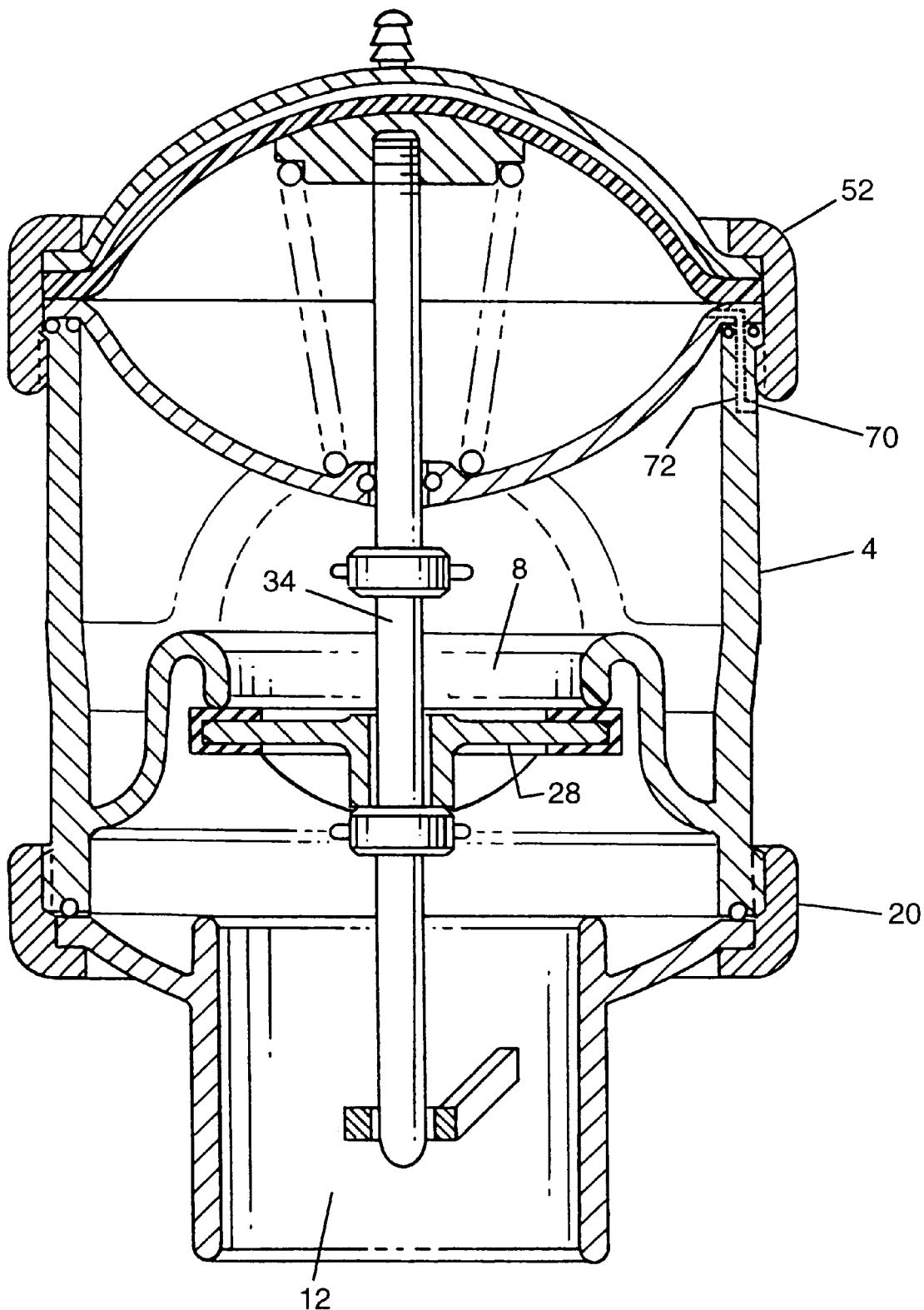
FIG. 2 is a sectional view taken along line 2—2 of the automatic three way valve illustrated in FIG. 1.
Figure 2A:
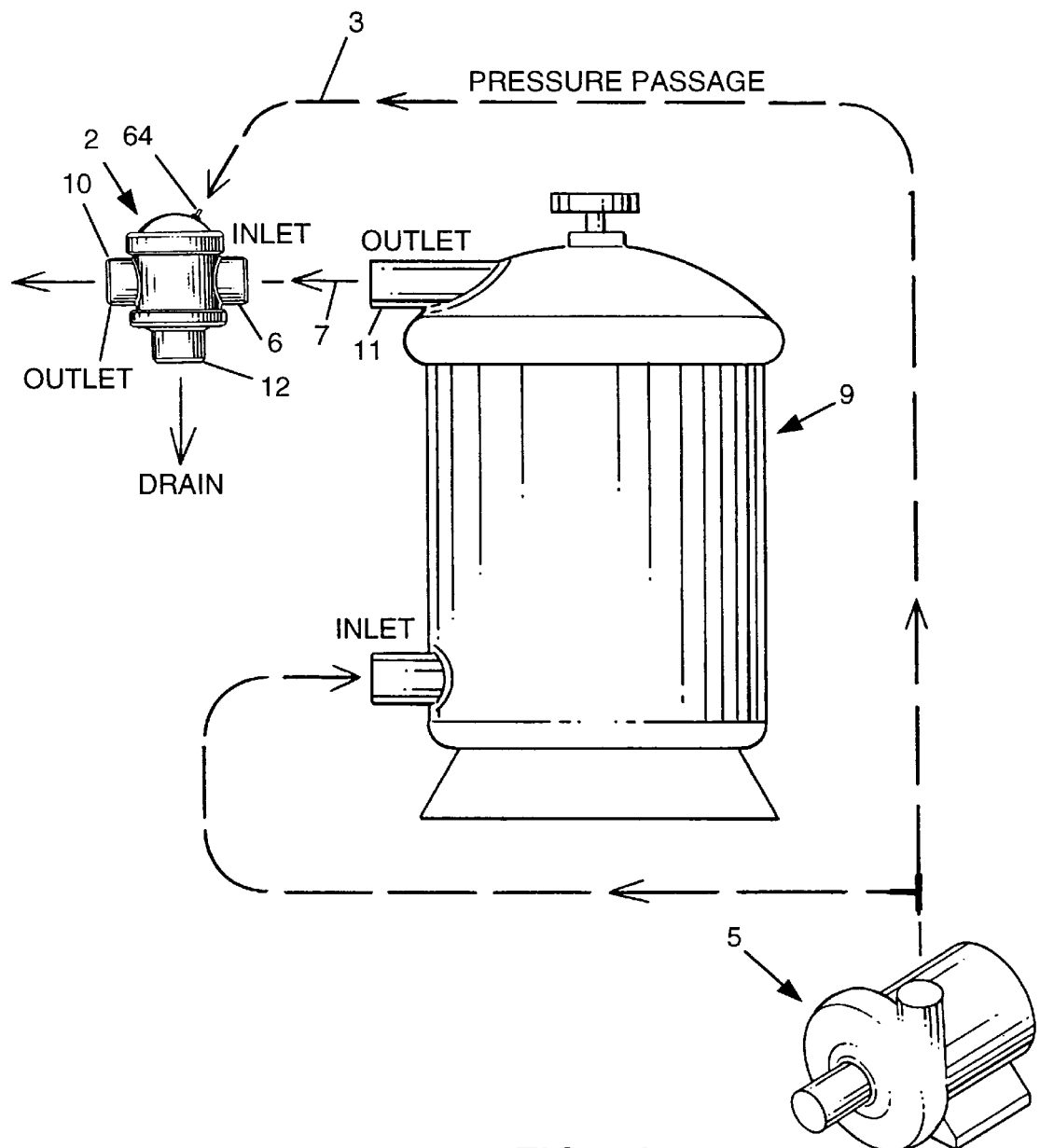
FIG. 2A is a schematic view an automatic three way valve constructed in accordance with the principles of the present invention connected to a pump and a filter.

Reference is now made to FIG. 1, FIG. 2 and FIG. 2A which illustrate an automatic three-way valve 2 constructed and operative as a preferred embodiment of the present invention. Automatic 3-way valve 2 is connected by a pressure line 3 to a pump 5 and by a line 7 to the outlet of a filter 9, as shown in FIG. 2A. Automatic 3-way valve 2 comprises housing 4 having inlet passage 6, internal passage 8, outlet passage 10 and drain passage 12. Fluid entering inlet passage 6 of 3-way valve 2 from a line 7 connected to an external source, such as a filter outlet 11 of a filter 9, can flow out from the 3-way valve through drain passage 12. Drain passage 12 is constructed from a drain sleeve 14 forming a through passage 16 and a conically shaped flange 18 extending outwardly from drain sleeve 14. Drain passage 12 is connected to housing 4 by compression ring 20 being threadably secured to the housing shoulder 26 by the threaded interconnection portion 22. The conically shaped flange 18 is sealed between the compression ring 20 and the housing shoulder 26 by O-Ring 24 located between the conic flange 18 and housing shoulder 26. A sealing flange 28 is typically provided with a sealing surface 29, such as a rubber ring 30. The rubber ring 30 is preferably constructed with a U shaped cross-section adapted to fit over the outer circumferential surface of sealing flange 28. It is also within the scope of the invention to shape the rubber ring 30 with some other cross sectional configuration or to construct the ring of some other material. Sealing flange 28 is also provided with aperture 32 located generally at the center thereof. Sealing flange 28 is adapted to move linearly between internal passage 8 and drain passage 16 in order to open one passage while moving to close the other passage and vice versa. Linear movable shaft 34, having first and second ends is located within the central area of 3-way valve 2 and extends through aperture 32. Stops 36 and 38 are fixedly connected to linear movable shaft 34 and are disposed on either side of sealing flange 28. The stops 36 and 38 are disposed a predetermined distance between each other and between themselves and the closest respective side of sealing flange 28. The stops 36 and 38 are adapted to push flange 28 as shaft 34 moves in a linear direction to open either one of the two passages, internal passage 8 or drain passage 16 and to close the other of the passages. First end 40 of linear movable shaft 34 extends through and is supported by support bearing 42 connected to sleeve drain 14 by ribs 44. Second end 46 of movable shaft 34 is connected to a support plate 48 located within hydraulic unit 50 which is connected to housing 4. A compression ring 52 secures a first cap 54, a diaphragm 56 and second cap 58 of hydraulic unit 50 by means such as with a threadable interconnection portion 60 to housing 4. Diaphragm 56, located between first cap 54 and second cap 58, divides hydraulic unit 50 into first and second compartments 62 and 66. First compartment 62, located between diaphragm 56 and first cap 54, is in flow communication with pressure passage 64. The pressure passage 64 is adapted to take in pressurized fluid flowing from external source of pressurized fluid such as pump to compartment 62 in order to effect the movement of linear movable shaft 34 and to relief such pressure. Second compartment 66 provided with support plate 48 and bias spring 68 is located between diaphragm 56 and second cap 58. Bias spring 68 compress support plate 48 in order to effect the movement of movable shaft to one direction. Compartment 66 communicate with relief passage 70 through elongated holes 72 located on shoulder 73. Shoulder 73 located on one end of housing 4 and second cap 58 are sealed by O-Rings 74 disposed between said second cap and said shoulder. O-Rings 74 also seals between holes 72. Linear movable shaft 34 moves back and forth through aperture 76 and O-Ring 78 both disposed generally at the center of second cap 58.

Description of operation of the three way valve in accordance with the Embodiment of FIGS. 1, 2 and 2A Fluid from external source such as outlet of a filter enters 3-way valve 2 through inlet passage 6 and exits the valve through drain 12 passage. Simultaneously pressurized fluid from a source such as a pump enters through passage 64 to compartment 62 and presses diaphragm 56, support plate 48, and movable shaft 34 against bias spring 68 in order to move movable shaft 34 through aperture 32 and stop 36 toward sealing flange 28. Such movement continues until stop 36 pushes sealing flange 28 to open passage 8 and close passage 16 in order to allow the flow from inlet passage 6 to flow through passage 8 and then to outlet passage 10. Such flow continues until the pressurized fluid to passage 64 is shut-off as a result of the shut-off of its source such as a pump. Then bias spring 68 pushes support plate 48 and moves movable shaft 34 to exhaust the pressurized fluid from compartment 62 out through passage 64 and to draw in air from the atmosphere to compartment 66 through passage 70. Movable shaft 34 moves freely through aperture 32 and stop 38 moves toward flange 28 until the stop pushes sealing flange 28 to open passage 16 and close passage B. A person with technical skills will understand that the predetermined distance between sealing flange 28 and one of the stops 36 or 38 acts as a timer indicating the time of occurrence of either opening or closing of passages 8 or 16 after the beginning or the shut-off of flow entering 3-way valve 2. The distance between the two stops 36 and 38 and the size of passage 64 establish the time period passing from the time of the opening or closing of an external source, such as the opening or shutting-off of the pump from the time of the opening or closing of one of passages 8 or 16.

Figure 3:
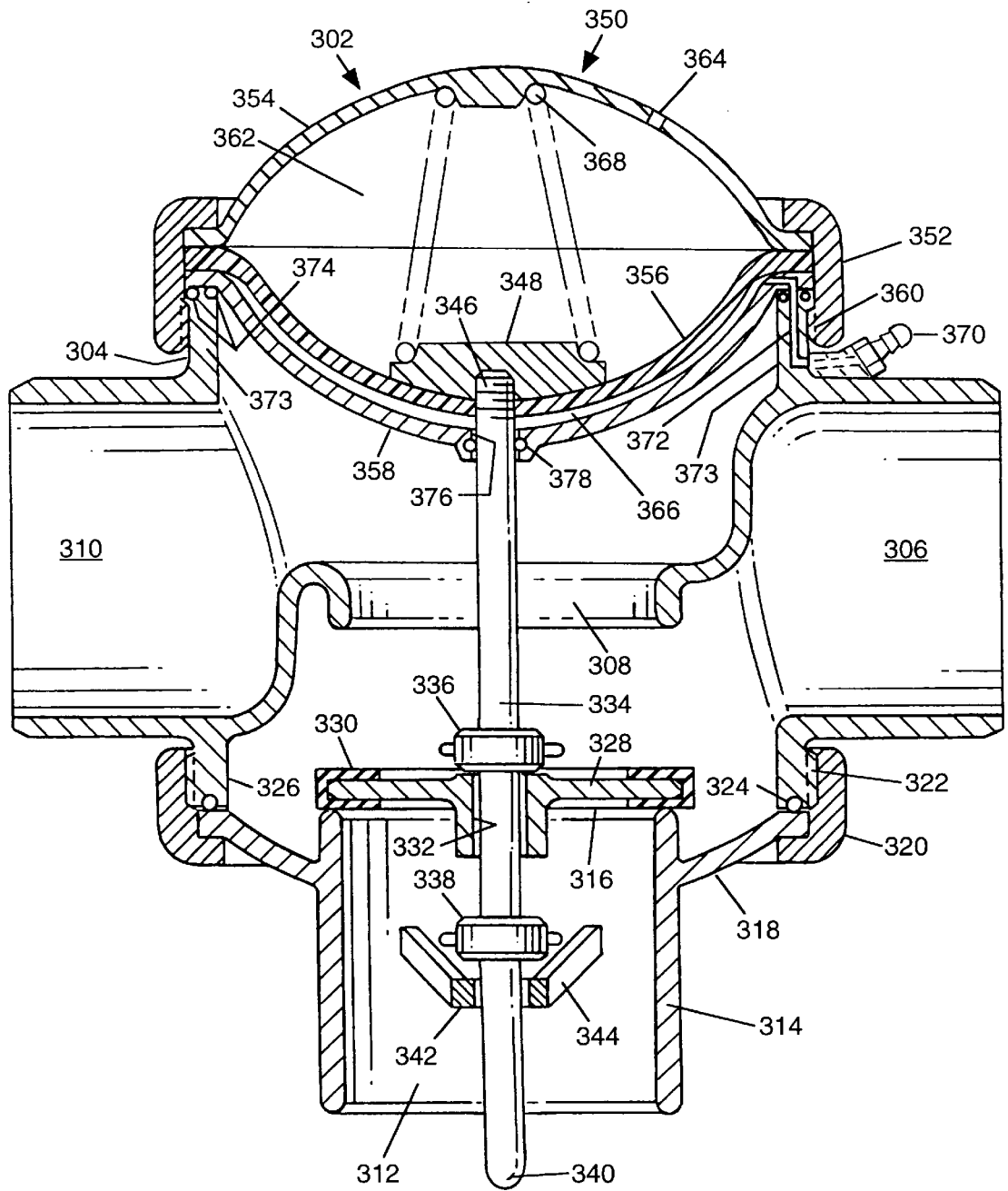
FIG. 3 is a sectional view along the center of the automatic three way valve constructed in accordance with the preferred embodiment of the present invention.

Reference is now made to FIG. 3 which illustrates another preferred embodiment of an automatic 3-way valve 302, constructed and operative in accordance with the present invention, and similar to the embodiment of FIGS. 1, 2, and 2A. The portions of structural elements, of this second embodiment and the remaining embodiments, which are substantially identical to corresponding structure in the embodiment of FIGS. 1, 2, and 2A, as to the description of their function, their operation and their design is the same throughout the present specification. Automatic 3-way valve 302 includes a housing 304 having three passages. Fluid flows to 3-way valve 302 from an external source, such as the outlet of a filter, passes through inlet passage 306, through passage 308 and finally out from 3-way valve 302 through drain passage 310. Drain passage 310 is adapted to output fluid mixed with sediments, when necessary, from valve 302. Outlet sleeve 314 has an outlet passage 312 at one end and an inlet passage 316 at the other opposite end. A conically shaped flange 318, extending outward from outlet sleeve 314, is disposed in abutting relation to housing shoulder 326 of housing 304 and is secured thereto by compression ring 320. The compression ring 320 is secured, by conventional means such as threaded section 322, in such a manner that O-Ring 324 seals between the housing shoulder 326 and conically-shaped flange 318.

Sealing flange 328 is typically provided with a sealing surface, such as a rubber ring 330. The rubber ring 330 is preferably constructed with a generally U shaped cross-section adapted to fit over the outer circumferential surface of sealing flange 328. It is also within the scope of the invention to shape the rubber ring 330 with some other cross sectional configuration or to construct the ring of some other material. Sealing flange 328 is also provided with aperture 332 located generally at the center thereof. A sealing flange 328 is adapted to move linearly between passage 308 and passage 316 in order to open one passage and close the other passage and vice versa. Shaft 334, having first and second ends 340 and 346, is located in the central area of 3-way valve 302 and extends through aperture 332 located on flange 328. Stops 336 and 338 are connected to movable shaft 334 and are located at a predetermined distance between each other and between themselves and from the closest side of flange 328. Stops 336 and 338 are preferably positioned to press against flange 328 in order to move and open either passage 308 or 316 while beginning to move and close the other one. First end 340 of movable shaft 334 extends through support bearing 342 connected to drain sleeve 314 by ribs 344. Second end 346 of movable shaft 334 is connected to support plate 348 located in a hydraulic unit 350 which is secured to housing 304. Compression ring 352 secures first cap 354 of hydraulic unit 350, diaphragm 356 and second cap 358 of hydraulic unit 350 to housing 304 by means such as threadable section 360. Diaphragm 356, located between first cap 354 and second cap 358, divides hydraulic unit 350 into first and second compartments 362 and 366. First compartment 362, located between diaphragm 356 and first cap 354, is in flow communication with a relief passage 364 extending through cap 354. Relief passage 364 is adapted to pass fill and exhaust air between the compartment 362 and the atmosphere about the valve 302 during the movement of movable shaft 334. First compartment 362 comprises also a support base 348 connected to movable shaft 334. The support base 348 supports bias spring 368 and is adapted to press against support plate 348 in order to effect the movement of movable shaft 334 in one direction. Second compartment 366 is located between diaphragm 356 and second cap 358. Second compartment 366 communicates with pressure passage 370 through elongated holes 372 located between second cap 358 and shoulder 373 located on housing 304. A pair of O-rings 374, located between second cap 358 and shoulder 373, seal the second cap 358 to shoulder 373 and also to seal fluid in holes 372. Second cap 358, having an aperture 376 and O-Ring 378 located generally at the center thereof, is constructed to permit movable shaft 334 to move back and forth therethrough while still having a seal between the shaft 334 and the second cap 358 to prevent leakage therebetween. It is also in the scope of the present invention that passage 376 will be constructed without O-Ring 378.

Description of operation of 3-way valve 304 with reference to FIG. 3.

Fluid flow enters three way valve 304, from a source such as an outlet of a filter, through inlet passage 306, then flows through passage 308 and finally exits the valve through drain 310. Simultaneously, fluid from a source of pressurized fluid, such as pump, enters through passage 370, longitudinal holes 372 and into compartment 366. The fluid in compartment 366 presses diaphragm 356, support plate 348, and movable shaft 334 against bias spring 368. Linear movable shaft 334 moves freely through aperture 332 until stop 338 pushes flange 328 to open passage 316. Further movement of shaft 334 causes flange 328 to close against passage 308 with seal 330 so that the fluid from inlet passage 306 would flow to outlet passage 312. When pressurized fluid stops flowing as a result of shut-off of the source of pressurized fluid, such as a pump shown in FIG. 2A, bias spring 368 presses against support plate 348, diaphragm 356 and movable shaft 334 to move stop 336 towards flange 328. By this movement, air from the atmosphere surrounding valve 302 is drawn into compartment 362 through passage 364 and pressurized fluid is exhausted from compartment 366 through passage 370. Movable shaft 334 moves freely through aperture 332 until stop 336 pushes flange 328 to open passage 308 and close passage 316. The shaft 334 moves in this direction, in order to open drain passage 310 so that it can receive flow coming from inlet passage 306, when the flow starts flowing from the external source.

Figure 4:
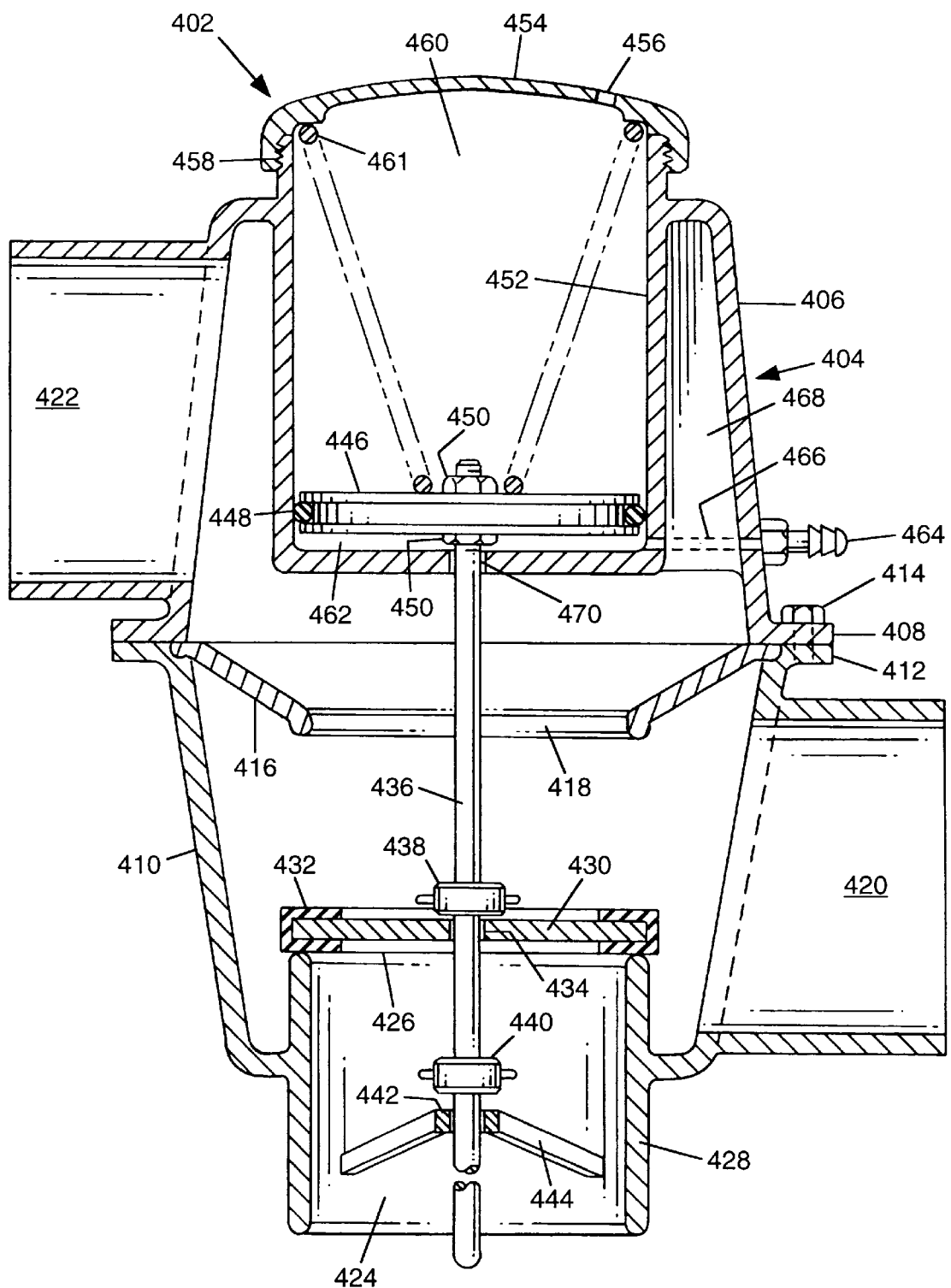
FIG. 4 is a sectional view of an automatic three way valve constructed and illustrated in accordance with another preferred embodiment of the present invention.

Reference is now made to FIG. 4 which illustrates an automatic three-way valve 402 constructed and operative in accordance with another preferred embodiment of the present invention. Three-way valve 402 comprises a housing 404 assembled from first and second main parts 406 and 410. First main part 406 has a flange 408 provided on its end and second main part 410 has a flange 412 provided on its end. First and second main parts 406 and 410 are connected to each other by conventional means, such as for example screws 414 which extend through flange 408 and flange 412. Conically shaped flange 416, having a passage 418 disposed substantially in its center, is secured at its circumference area between flange 408 and flange 412. Inlet passage 420 of 3-way valve 402, located in the second main part 410, is adapted to receive fluid flow from an external source of pressurized fluid such as the outlet of a filter. Drain passage 422, located in the first main part 406, is adapted to output the flow of fluid, generally mixed with sediments, flowing from inlet 420, and through passage 418 to a location outside of the 3-way valve. Outlet passage 424 and inlet passage 426 of outlet sleeve 428 are located at the end of second main part 410 of 3-way valve 402 and adapted to outlet fluid flow therefrom. Flange 430, located between passage 418 and passage 426, has a sealing ring 432 (preferably in U shape but can be shaped in other configurations) secured to its circumference surface and a throughbore or aperture 434 located substantially at the center of flange 430. Flange 430 is adapted to move back and forth between passage 418 and passage 426 in order to open one passage and close the second one. Movable shaft 436, having first and second ends, is located substantially at the center of 3-way valve 402 and extends through aperture 434 of flange 430 to transfer linear movement to the flange 430. Movable shaft 436 is provided with two stops 438 and 440 connected thereon and located on both sides of flange 430 at a predetermined distance set so that when shaft 436 moves in one direction, stop 440 moves flange 430 away from inlet passage 426 and towards passage 418, and when shaft 436 moves in the other direction stop 438 moves flange 430 to open passage 418 and close inlet passage 426. Bearing 442 connected to outlet sleeve 428 by ribs 444 is adapted to support movable shaft 436 which extends through bearing 442 by its first end. Movable shaft 436 is adjusted to move freely through aperture 434 and transfer linear movement to flange 430 in such manner that the linear movement of shaft 436 only effects the movement of flange 430 when one of stops 440 or 438 pushes flange 430 in the direction that it is free to move. Piston 446, with O-Ring 448 provided in its circumference area, is connected to second end (typically threaded) of movable shaft 436 by conventional means such as threaded nuts 450 and reciprocates in a cylinder 452. Cylinder 452, located in first main part 406, is open at one end and is enclosed with a cap 454 having a relief passage 456. The cap 454 is secured to the end of cylinder 452 by conventional means such as a threaded section 458. Piston 446 is adjusted to move back and forth inside cylinder 452 and to divide the cylinder into two compartments 460 and 462. Compartment 460, located on one side of piston 446, is in communication with relief passage 456. The relief passage 456 is adjusted to ventilate air in or out from compartment 460 during the linear movement of piston 446. Bias spring 461, located within compartment 460, is adapted to bias the linear movement of piston 446 in a first direction. Second compartment 462, located at the other end of piston 446, communicates with pressure passage 464 through longitudinal hole 466 located on ribs 468. Pressure passage 464 is adapted to intake and exhaust pressurized fluid or gas to and from compartment 462. The flow of pressurized fluid or air to compartment 462 is controlled by an external source of pressurized gas or fluid, such as pump, in order to provide linear movement of piston 446 in the second direction. On the opposite side of cap 454 is provided aperture 470 located on cylinder 452 adapted to allow for the intake and exhaust of gas or fluid through pressure passage 464 so that movable shaft 436 moves linearly back and forth through aperture 470.

Description of the operation of alternative embodiment of a 3-way valve as illustrated in FIG. 4.

Fluid flow from an external source such as the outlet of a filter enters valve 402 through inlet passage 420 and flows through passage 418 to exit through drain passage 422. Simultaneously, pressurized fluid from a source of pressurized fluid, such as a pump (See FIG. 2A), enters passage 464, holes 466 and compartment 462 in order to drive piston 446 and movable shaft 436 against bias spring 461. Movable shaft 436 moves freely through aperture 434 until stop 440 pushes against flange 430 to open passage 426 and close passage 418 so that the flow of pressurized fluid from inlet 420 is directed to flow through outlet passage 424. Valve 402 remains in the same position until pressurized fluid to compartment 462 is shut-off as a result of a shut off of the external pressure source, i.e. the pump. Then, bias spring 461 presses piston 446 and linear movable shaft 436 to effect a movement of linear shaft 436 through aperture 434. During the movement of shaft 436 and stop 438 toward flange 430, pressure from compartment 462 is exhausted to the outside atmosphere through passage 464 while air is drawn into compartment 460 from the atmosphere through passage 456. Movable shaft 436 continues to move freely through aperture 434 until stop 438 pushes against flange 430 to open passage 418 and close inlet passage 426. This movement enables valve 402 to receive the coming flow from an external source such as the outlet of a filter through inlet passage 420 and then to direct the flow through passage 418 to drain 422.

Figure 5:
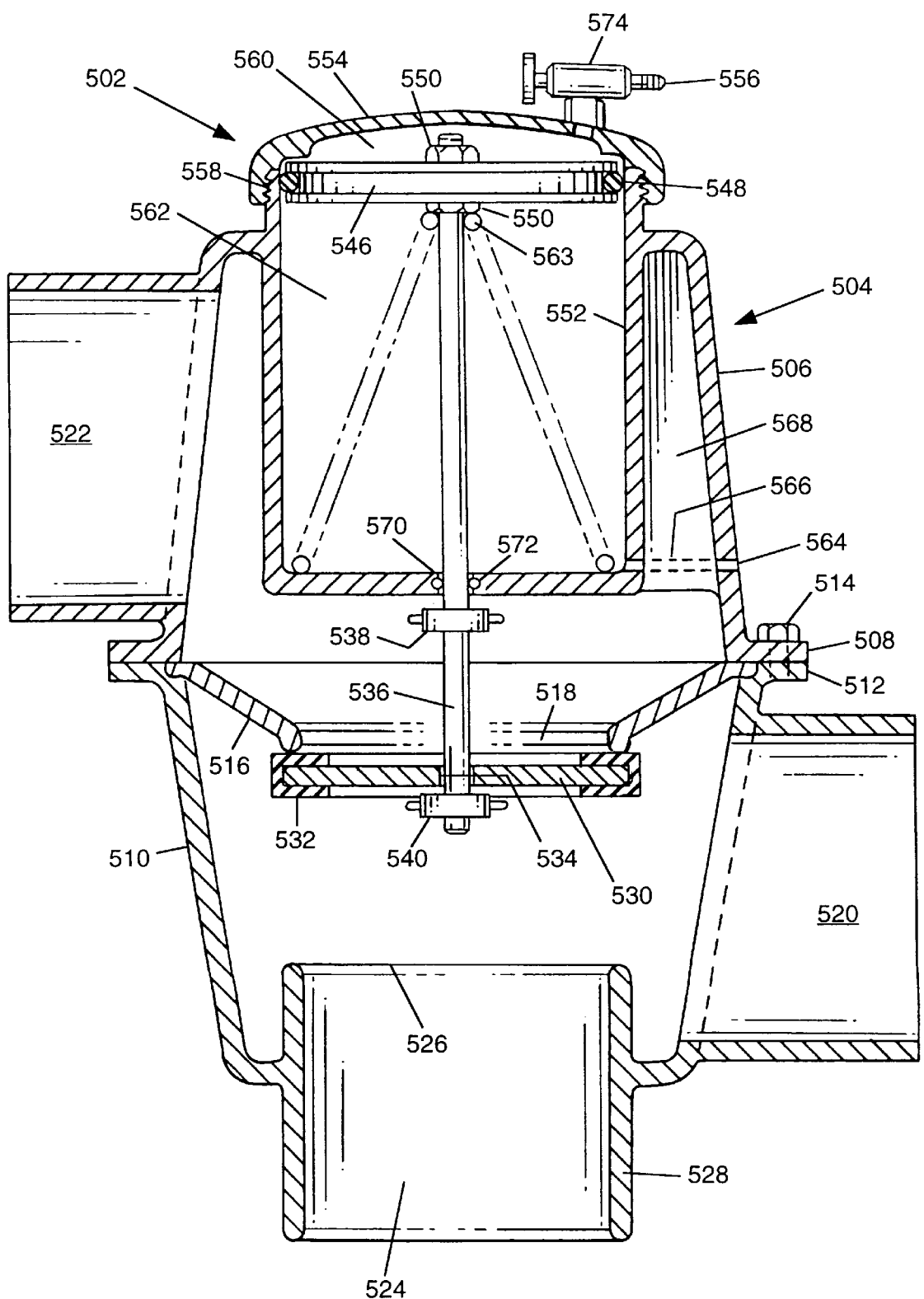
FIG. 5 is a sectional view of another embodiment of an automatic three way valve similar to the one illustrated in FIG. 4 but with a few distinctions.

Reference is now made to FIG. 5 which illustrates an automatic three-way valve 502 constructed and operative in a manner similar to the preferred embodiment of the present invention, as shown and described with respect to the configuration shown in FIG. 4 with some small variations. Three way valve 502 has a housing 504 assembled from first and second main parts 506 and 510, respectively. First main part 506 has a flange 508 provided on the end thereof and second main part 510 has a flange 512 provided on the end thereof. First and second main parts 506 and 510 are connected by means such as bolts 514 which interconnect flange 508 and flange 512. Conically shaped flange 516, having a passage 518 disposed substantially in its center, is secured by a section of its circumference between flange 508 and flange 512. Inlet passage 520, located in second main part 510, is adapted to receive fluid flow from an external source of pressurized fluid such as an outlet of a filter into valve 502 so that the fluid flows and exhausts through drain outlet passage 524 located on the second main part 510. Drain outlet passage 524 and drain inlet passage 526 of drain sleeve 528 are located in the end of second main part 510 and are adapted to drain fluid generally mixed with sediments from valve 502 when necessary. Sealing flange 530, located between passage 518 and inlet drain passage 526 is provided with a sealing ring 532, preferably with a U shaped cross section (but within the scope of the invention, to be shaped in other configurations, secured to the circumferential area of the sealing flange 530. Flange 530 has an aperture 534 located substantially in the center thereof. Flange 530 is adapted to move back and forth between passage 518 and drain passage 526 in order to close one of passages 518 or 526 and open the other. Movable shaft 536, having first and second ends, is located substantially at the center of valve 502 and extends with its first end through aperture 534 located on sealing flange 530. Stops 538 and 540 are connected to the first end portion of movable shaft 536 on both sides of sealing flange 530 in such manner that when shaft 536 moves in one direction, stop 538 presses against and moves sealing flange 530 to open passage 518. Further movement of the shaft 536 in the same direction causes sealing flange 530 to abut against and sealingly close passage 526. When shaft 536 moves in the other opposite direction, stop 540 pushes sealing flange 530 to open drain inlet passage 526 and eventually sealingly close against passage 518. Piston 546, having a seal 548 provided on its circumference, is connected to a second end of movable shaft 536 by conventional means such as threaded nuts 550 which are threadably attached to movable shaft 536 so as to secure piston 546 thereto. Cap 554, having a relief passage 556, is connected to the end of cylinder 552 by means such as a threaded section 558. Piston 546 is adjusted to move linearly back and forth inside cylinder 552 so as to divide cylinder 552 into two compartments 560 and 562. Compartment 560, located on one side of piston 546, is in communication with a pressure passage 556 that is adjusted to receive or exhaust pressurized fluid to and from compartment 560 during the linear movement of piston 546. The pressure is supplied to compartment 560 from an external source of pressurized fluid such as pump in order to effect the linear movement of piston 546. Second compartment 562 is provided with a bias spring 563 abutted against the other, opposite side of piston 546 and is in flow communication with relief passage 564 through longitudinal hole 566 located on ribs 568. Relief passage 564 is adapted to provide air flow to and from compartment 562 from the surrounding atmosphere. Aperture 570 with O-Ring 572 located on cylinder 552 is provided on the opposite side of cap 554 and adapted to allow movable shaft 536 to move linearly back and forth through aperture 570 and O-Ring 572. Control valve 574, located on cap 554, is connected to passage 556 in order to reduce or increase the size of passage 556.

Description of operation in accordance with FIG. 5.

Fluid flowing from an external source, such as the outlet of a filter enters through inlet passage 520 of valve 502 and flows generally mixed with sediments outside the valve through drain passage 524. Simultaneously, pressurized fluid enters passage 556, flows through control valve 574 and into compartment 560 to press piston 546 and movable shaft 536 against bias spring 563. Air from compartment 562 is exhausted to the atmosphere through relief passage 564. Movable shaft 536 moves freely through aperture 534 until stop 538 pushes flange 530 to open passage 518 and move towards passage 526 and ultimately to close passage 526 in order to permit flow flowing from the inlet 520 through passage 518 to flow to outlet 522. Such position of valve 502 remains until pressurized fluid coming to valve 502 stops as a result of shut-off of the source of pressurized fluid such as pump. When pressurized fluid stops flowing to the valve, bias spring 563 moves piston 546 and the movable shaft 536. This in turn causes stop 540 to push flange 530 in order to first open drain inlet passage 526 and then subsequently, to close passage 518. Fluid is relieved from compartment 560 through relief passage 556 and air is drawn into compartment 562 from the atmosphere through relief passage 564.

What is claimed is:

1. An automatic three way valve comprising:
  a housing having an inlet passage, passage to outlet and a passage to drain;
  a linearly movable shaft disposed in said housing having two stops separated by a predetermined distance;
  a hydraulic unit connected to said housing and to said linearly movable shaft to effect linear movement of said linearly movable shaft, and;

a sealing flange having an aperture substantially at the center thereof accommodating said linearly movable shaft, said sealing flange being movable on said linearly movable shaft between said passage to outlet and said passage to drain through the force of one of said stops on said sealing flange, said linearly movable shaft being biased to urge said sealing flange toward said passage to outlet by contact with one of said stops, wherein fluid pressure in said inlet passage tends to maintain said sealing flange in position to close said passage to outlet from said inlet passage despite limited movement of said linearly moveable shaft.

2. The three way valve according to claim 1 comprising a sealing flange having a seal with a U shape cross-section.

3. The valve according to claim 1, wherein said hydraulic unit includes a diaphram connected to said linearly movable shaft.

4. The valve according to claim 1, wherein said inlet passage is provided with fluid under pressure from a source.

5. The valve according to claim 4, wherein said hydraulic unit is provided with fluid under pressure from said source.

6. The valve according to claim 4, wherein said predetermined distance between said two stops effects a time delay between the application of pressurized fluid to the hydraulic unit and the sealing flange opening the passage to outlet to fluid communication with the inlet passage.

7. The valve according to claim 1, wherein said linearly movable shaft is biased so that the sealing flange is biased toward closing the passage to outlet.

8. A three way valve comprising:

a housing having an inlet passage to receive fluid coming to said valve under pressure from a source, a passage to outlet to outlet fluid from said valve and a passage to drain to drain fluid from said valve;

a hydraulic unit including a diaphram and an inlet for fluid under pressure from said source;

an axially movable member with two stops provided thereon, said axially movable member being connected to said diaphram of said hydraulic unit and moveable with said diaphram, and;

a sealing member movably disposed on said axially movable member between said two stops and between said passage to outlet and said passage to drain, said axially movable member being biased to urge said sealing member toward said passage to outlet by contact with one of said stops, wherein fluid pressure in said inlet passage tends to maintain said sealing member in position to close said passage to outlet from said inlet passage despite limited movement of said axially moveable member until pressure on said diaphram has caused said axially movable member to move sufficiently that one of said stops forces said sealing member away from said passage to outlet.

9. The valve according to claim 8 wherein said hydraulic unit comprises at least one compartment being in communication with a pressurized fluid passage located in said hydraulic unit in order to receive or relieve pressurized fluid in and from said compartment in order to effect the linear movement of said axially movable member.

* * * * *